United States Patent
Price et al.

(10) Patent No.: US 9,232,045 B1
(45) Date of Patent: Jan. 5, 2016

(54) POWER MANAGEMENT FOR IP PBX DURING POWER FAILURE

(75) Inventors: Patrick Andrew Price, Madison, AL (US); James S. Warnick, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 13/537,942

(22) Filed: Jun. 29, 2012

(51) Int. Cl.
*H04M 1/24* (2006.01)
*H04M 3/12* (2006.01)

(52) U.S. Cl.
CPC .................................. *H04M 3/12* (2013.01)

(58) Field of Classification Search
CPC ........ H04M 3/12; H04M 3/2254; H04M 3/30
USPC .......... 379/9.05; 709/224; 370/352; 713/323; 307/23
See application file for complete search history.

(56) References Cited

U.S. PATENT DOCUMENTS

| | | | | |
|---|---|---|---|---|
| 6,512,817 | B1* | 1/2003 | Dale | H04M 3/2272 379/1.01 |
| 7,408,923 | B1* | 8/2008 | Khan et al. | 370/352 |
| 8,819,464 | B2* | 8/2014 | Arai | G03G 15/5004 713/323 |
| 2010/0019574 | A1* | 1/2010 | Baldassarre et al. | 307/23 |
| 2012/0311141 | A1* | 12/2012 | Durazzo et al. | 709/224 |

* cited by examiner

*Primary Examiner* — Fan Tsang
*Assistant Examiner* — Van D Huynh
(74) *Attorney, Agent, or Firm* — Maynard Cooper & Gale, P.C.; Jon E. Holland

(57) ABSTRACT

A telecommunication system is described that allocates backup power to telephones based on telephone usage. When power to the telecommunication system from a primary source, such as from an electrical utility company, is lost, a backup power source is used to keep the telecommunication system functioning. Because the backup power source has a limited amount of energy, only telephones with a high priority are fully powered. Other telephones are provided with reduced power or receive no power. As the energy level of the backup power source is reduced, the telephone priorities are adjusted.

24 Claims, 7 Drawing Sheets

|  | Phone 1 | | | Phone 2 | | |
| --- | --- | --- | --- | --- | --- | --- |
| Day | No. of Calls made | No. of Calls received | Duration of phone use (min) | No. of Calls made | No. of Calls received | Duration of phone use (min) |
| 1 | 3 | 4 | 45 | 1 | 2 | 6 |
| 2 | 6 | 2 | 55 | 0 | 0 | 0 |
| 3 | 7 | 7 | 32 | 0 | 0 | 0 |
| 4 | 5 | 8 | 67 | 3 | 3 | 12 |
| 5 | 13 | 3 | 70 | 2 | 0 | 4 |
| 6 | 2 | 6 | 22 | 2 | 0 | 3 |
| 7 | 2 | 4 | 9 | 2 | 0 | 3 |
| 8 | 8 | 5 | 23 | 4 | 3 | 13 |
| 9 | 9 | 7 | 45 | 3 | 2 | 20 |
| 10 | 9 | 12 | 63 | 2 | 3 | 17 |
| Average | 6.4 | 5.8 | 43.1 | 1.9 | 1.3 | 7.8 |
| High Priority Threshold | 5 | 5 | 30 | 5 | 5 | 30 |
| | High Priority Assigned | | | Low Priority Assigned | | |

FIG. 9

POWER MANAGEMENT FOR IP PBX DURING POWER FAILURE

RELATED ART

There is currently a growth of IP (Internet Protocol) PBXs (Private branch exchanges) as replacements for traditional analog PBXs typically used by businesses. Such IP PBXs deliver services such as voice, video and data. These exchanges have many of the features and services of traditional analog PBXs, but transport such features and services using a LAN (local area network), such as an Ethernet, and a WAN (wide area network).

IP telephones are configured to receive both power and voice data over the wire pairs of the LAN. The IP PBX is usually powered by an alternating current (AC) source of an electrical utility that is often coupled to the IP PBX via a UPS (uninterruptible power source). The UPS generally has one or more batteries for providing a limited amount of energy for powering the IP PBX when power from the utility company is lost due to a fault or other condition. Further, that limited energy is generally converted to AC by the UPS and then back into DC by the power supply of the PBX. Hence, it may be desired by some PBX users to include a high-energy backup power source within the PBX in order to keep the PBX functioning when the UPS power is exhausted. Such backup power source, however, has a limited life when the power from the AC source of the electrical utility is interrupted.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 9 is a table illustrating exemplary usage parameters for telephones for determining telephone priorities based on usage history for a telecommunication system, such as is depicted by FIG. 3.

DETAILED DESCRIPTION

For a telecommunication system that uses an IP PBX to provide telephone service, the system typically exchanges data with a plurality of IP telephones. Such an IP telephone may be a PD (powered device) that receives power over a cable having wire pairs that also are used to exchange the data. In this regard, the IP PBX is a PSE (power sourcing equipment) in that it provides power to the IP telephone. A utility company usually provides primary power to the IP PBX as alternating current (AC) voltage. In order to protect the IP PBX from power surges, noise, and temporary power loss, an interface circuit, such as an uninterruptable power supply (UPS), couples the AC voltage to the IP PBX. If power from the utility company is unavailable for any reason, such as a power line fault, then the UPS keeps the IP PBX and attached PDs operational for a short period of time that depends on the energy capacity of one or more batteries within the UPS. Typically, a battery of the UPS has its direct current (DC) voltage converted to an AC voltage at a value that is suitable for the IP PBX. The UPS may keep the telecommunication system operational for several minutes or longer. However, the UPS is typically not designed to furnish power for a long period of time, such as several days or weeks as might occur during various emergency conditions caused by weather, natural disasters, or other significant events.

An embodiment of a telecommunication system of the present disclosure comprises an IP PBX having a switching element configured to selectively couple power to IP telephones when power is supplied by a backup power source of the IP PBX. The selectivity is based on priorities assigned to the IP telephones, and the priorities are determined by a tracked usage history of the IP telephones. As an example, IP telephones associated with a certain amount of usage during a certain time period may be assigned one priority while IP telephones with a lesser amount of usage during such time period may be assigned a different priority. If desired, the assigned priorities can be dynamically adjusted in response to changes in the usage histories over time as the power outage persists. For example, an IP telephone with a low priority may be assigned a high priority if that IP telephone has a significant increase in usage.

Figure 1:
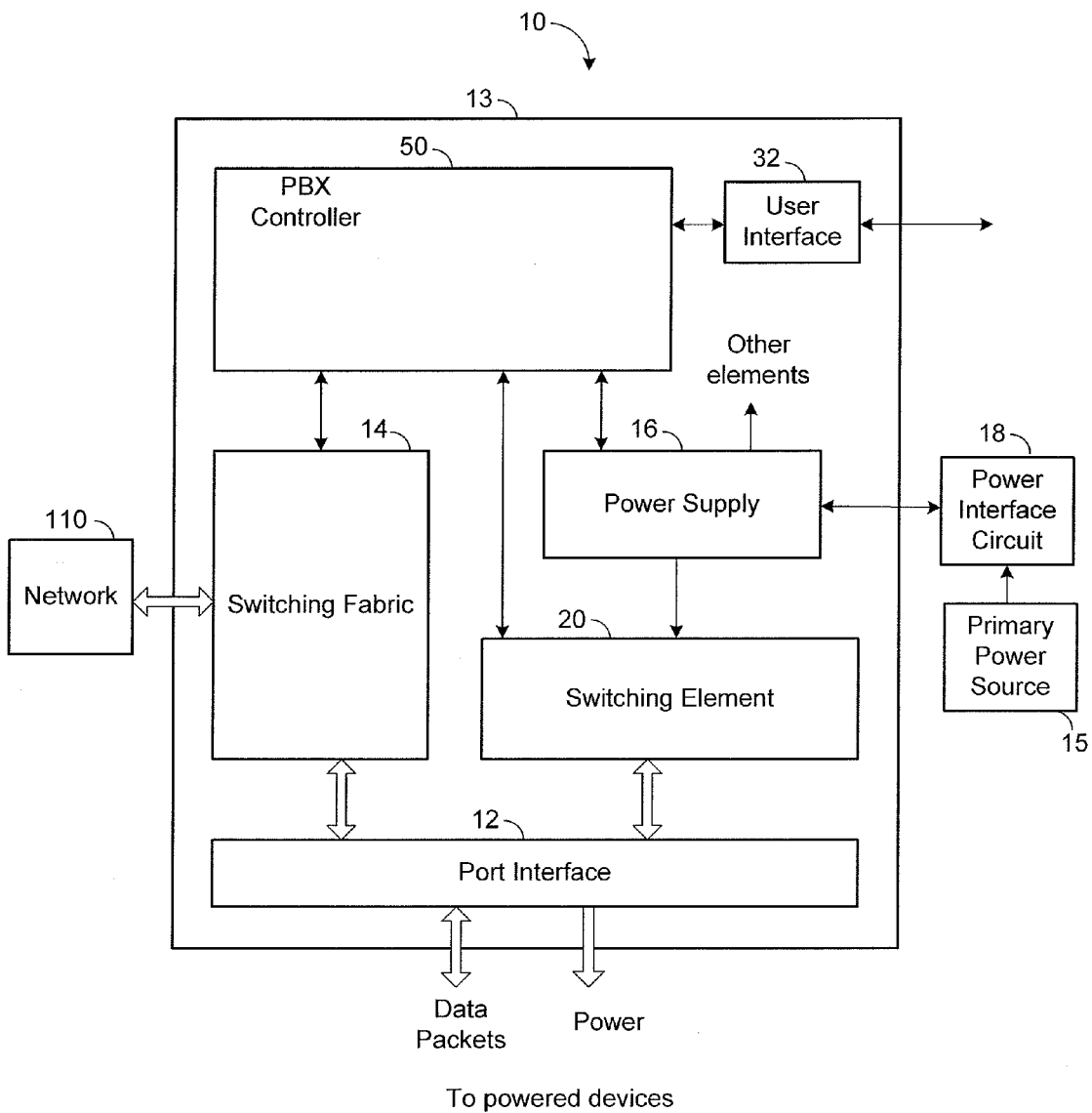
FIG. 1 is a block diagram illustrating a conventional telecommunication system having a UPS with power backup.

FIG. 1 depicts a conventional telecommunication system 10 having a conventional IP PBX 13 coupled to a network 110 and to PDs such as IP telephones. The IP PBX 13 provides power to and exchanges data with the PDs via port interface 12. The PDs are coupled to the port interface 12 via cables, such as Ethernet cables, having wire pairs, wherein a PD may exchange information with another PD or with devices connected to network 110 via switching fabric 14. A power supply 16 of the telecommunication system 10 provides voltages for powering PBX controller 50, PDs and other elements of the telecommunication system 10. Power supply 16 receives energy from a primary power source 15 coupled to the IP PBX 20 via power interface circuit 18, such as a UPS. The power interface circuit 18 protects the telecommunication system 10 from line surges, noise, and loss of primary power source 15. Protection from loss of primary power is provided by at least one battery (not shown in FIG. 1) within interface circuit 18. Such a battery often has an energy storage capacity of several kilowatt hours. Depending on the energy requirements of telecommunication system 10 and the energy capacity of the battery, the telecommunication system 10 may operate for several minutes or more before the IP PBX 13 is shut down due to power loss. In general, the energy storage capacity of the battery is sufficient to allow for a non-harmful shutdown of the telecommunication system 10 upon loss of primary power and such that the telecommunication system 10 has time to notify users of the loss of primary power. Notified users may reduce usage, and control logic of PBX controller 50 may send a control signal to switching element 20 to initiate a power reduction action. The status of the IP PBX 13 may be monitored and modified by a user via user interface 32.

The power reduction action for the telecommunication system 10 depends on priority information stored in memory and a control strategy used by the PBX controller 50. Actions taken by the switching element 20 include removal of power to some PDs and directing other PDs to transition to a low-power state when a PD has that feature. The PDs may be IP telephones, data connections to computers, webcams and similar components. In addition, elements of the IP PBX 13 may be placed in reduced power states. For example, some transceivers and circuits of the switching fabric 14 may transition to low power states if such an action is possible.

Figure 2:
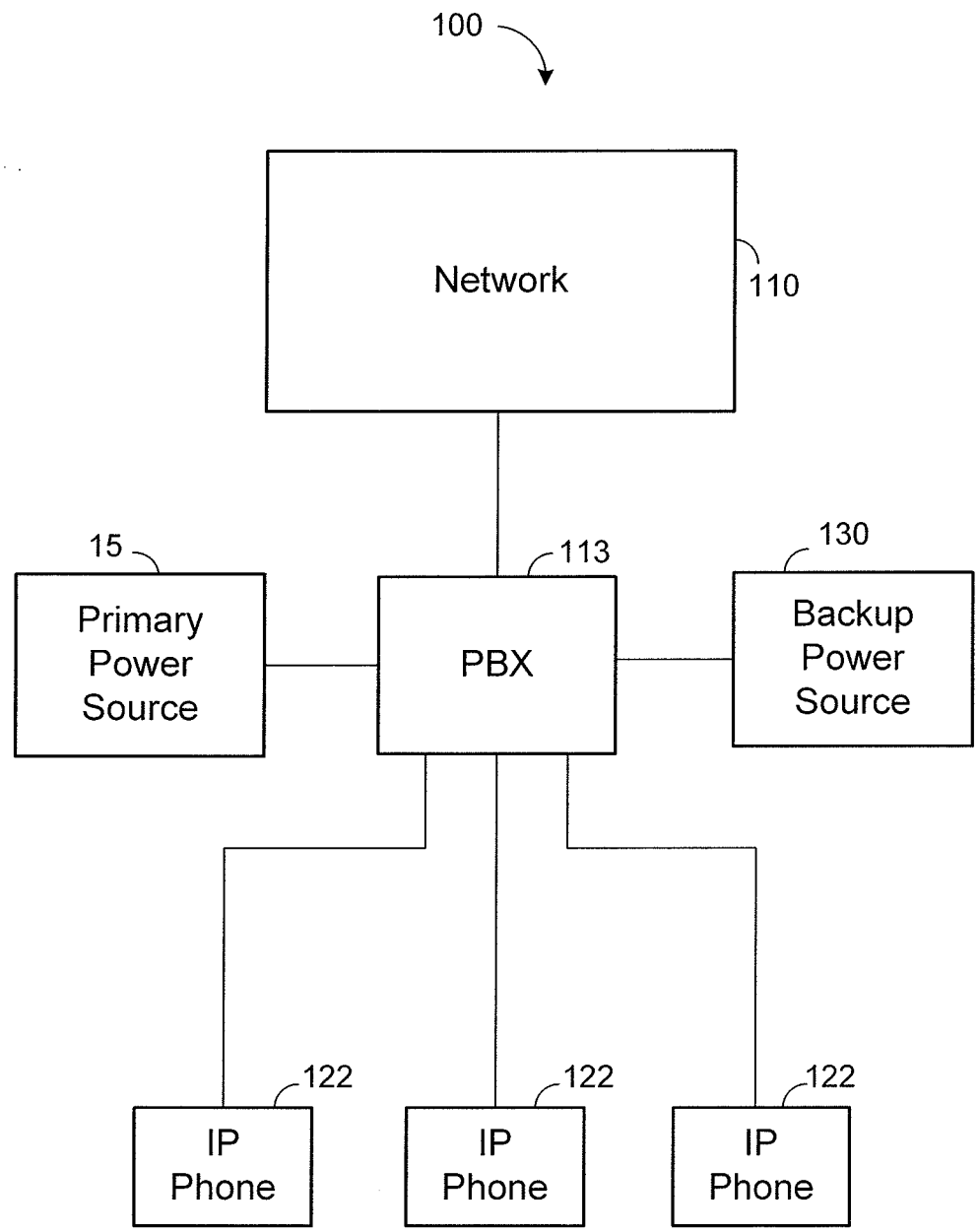
FIG. 2 is a block diagram illustrating an exemplary embodiment of a telecommunication system in accordance with the present disclosure.

An exemplary embodiment of a telecommunication system 100 in accordance with the present disclosure is depicted in FIG. 2. The telecommunication system 100 comprises a network 110 coupled to an IP PBX 113. IP telephones 122 are coupled to the IP PBX 113 so that voice services are available between such IP telephones 122 or to voice services from telephones connected through network 110. IP PBX 113 receives power from a primary power source 15 that may be coupled to the IP PBX 113 via a UPS. When primary power is unavailable, the telecommunication system 100 is configured to receive power from a backup power source 130 (e.g., a battery). In one embodiment, all devices of the telecommunication system 100 receive power from the backup power source 130 for a predetermined period of time in order to accommodate the needs of a person using an IP telephone or transferring data from a data device. When the backup power source 130 is furnishing power, logic within the IP PBX 113 directs the backup power source to furnish power to selected IP telephones 122 based on a dynamic selection process.

In one exemplary embodiment of the telecommunication system 100, priority values for IP telephones 122 are automatically assigned based on a tracked usage history. Usage history includes, but is not limited to, time usage of an IP telephone, number connections completed by an IP telephone, amount data transferred by a data device, number of emergency messages initiated by a device, and/or other such activities of devices connected to the telecommunication system 100. In general, most conventional PBXs gather user data and store that user data in memory. The IP PBX 113 may be configured to similarly gather usage data to define the usage history desired herein. In order to extend the operational life of the telecommunication system 100, the IP PBX 113 takes actions based on the assigned priorities for reducing energy usage upon loss of power from the primary power source, as will be described in more detail hereafter.

In one embodiment, the usage history is determined using a time-windowed usage technique, where a usage value of an IP telephone is based on a defined time interval. For example, such a time interval may be the last 10 business days. Other time intervals are possible in other embodiments. The usage value assigned to each IP telephone 122 is indicative of an amount of time that the IP telephone 122 is used during the defined time interval. As an example, in one embodiment, a higher usage value for a given IP telephone 122 indicates that the IP telephone 122 was used longer during the defined time interval.

The total usage of each IP telephone 122 over such a windowed time period is regularly updated, such as at the end of each business day, once a week, or some other time interval. In addition, the power management logic 152 is configured to sort the total usage in an ordered sequence from the greatest usage to the least usage. The IP telephone 122 with the most usage within the defined time period are assigned the highest priority, the IP telephone with the next most usage in such time period are assigned the next highest priority, and so on based their location provided by the sorting routine. As an example, IP telephones 122 with the most usage, for example, the top 10 percent of the ordered sequence, or a total usage above a predefined threshold, are assigned a first priority, referred to hereafter as "high priority," and the other IP telephones 122 are assigned a second priority, referred to hereafter as "low priority." In other embodiments, where priorities are based on usage history, other methods for assigning priorities are possible. For example, statistical parameters, such as a mean value, a median value, and a standard deviation, for IP telephone usage histories may be calculated. If a usage value for a given IP telephone 122 exceeds, for example, the mean value, then the PBX controller 150 assigns a high priority to that IP telephone 122, and if the usage value is below the mean value, the controller 150 assigns a low priority to that IP telephone 122. Because IP telephone usage changes, an IP telephone's priority may change, i.e., priorities are dynamic. In that regard, an IP telephone with a first priority may have a second priority at a later time, depending on IP telephone usage patterns.

Further, in some embodiments, there may be more than two priority levels. As an example, IP telephones 122 with a usage above a first threshold may be assigned a first priority, IP telephones 122 with a usage between the first threshold and a second threshold may be assigned a second priority, and IP telephones 122 with a usage below the second threshold may be assigned a third priority.

In another embodiment, the assigned priorities may be based on factors other than usage history. For example, some IP telephones have a first priority or a second priority based on usage, and other IP telephones may have predefined priorities set by a system manager that provides an input to the controller 150 through user interface 32. If desired, predefined priorities of IP telephones set by inputs from the system manager may have precedence of usage priorities. As an example, when an IP telephone is selected and configured to serve as communication link to a first responder in an emergency situation, such a telephone may have a predefined priority that is as high or higher than any priorities set by usage history. In such a scenario, there may be some IP telephones that have low usage, but are deemed essential by the system manager and therefore should receive power from backup source 130. Such IP telephones may be assigned a high priority even though their usage is low.

To better illustrate how priorities may be assigned, refer to FIG. 9, which depicts a table 900 illustrating exemplary usage of two telephones over a windowed time interval of the last 10 days. The information for the table 900 is preferably tracked and stored by the PBX 113 for use in making priority decisions, as will be further described below. As shown by FIG. 9, phone 1 usage is shown in column 910, and phone 2 usage is shown in column 920. Each phone has usage parameters comprising a number of calls made, a number of calls received, and a duration of use. Further, each phone has a 10 day average for these parameters as shown in row 930. Exemplary thresholds for assigning priorities are shown in row 940.

In one embodiment, the PBX 113 assigns a high priority to a phone if any of the thresholds are exceeded. Thus, the PBX 113 assigns a high priority to phone if the average number of calls made is greater than 5, if the average number of received calls is greater than 5, or if the average usage duration is greater than 30. Since the usage of phone 1 satisfies all these high priority conditions, it is assigned a high priority, but phone 2 is assigned a low priority since its usage exceeds none of the thresholds. In other embodiments, other schemes for assigning priority are possible. As an example, a phone may be assigned a high priority if a particular threshold is exceeded or alternatively a particular number of thresholds are exceeded. Further, other parameters may be used for making a priority decision. As an example, the amount of data transmitted and/or received may be tracked and compared to a threshold to determine which priority to assign to the phone.

Other factors related to dynamically assignment of priorities include the current energy level of the backup power source 130, the expected return time of power from the primary power source (if known), telephones designated as emergency telephones, and similar other factors. For example, as the time of loss for primary power increases, the amount of energy remaining in the backup power source has decreased. When the backup power source reaches a threshold level, such as 50% of energy remains available, then priority assignments for IP telephones may be changed. As a mere example, the priority thresholds may be adjusted so that fewer IP telephones 122 are assigned to a high priority level resulting in more telephones 122 transitioning to a low power mode of operation, thereby conserving more energy from the backup power source 130. In another example, if the utility company furnishing primary power predicts that primary power will be available within a certain time period, such as 30 minutes, then IP telephone priorities could be changed depending on the remaining power and expected loads. As an example, the priority thresholds may be adjusted so that more IP telephones 122 are assigned to a high priority level resulting in the consumption of more power from the backup power source 130 so that a greater number of services and/or features are made available close to the end of the power outage. In such a scenario that indicates primary power will return soon, it may be possible that no IP telephones need to be disconnected or placed in a reduced power condition.

There are various ways that the PBX 113 can learn the expected time for restoration of the primary power. As an example, a notification may be sent to the PBX 113 via the network 110 from a utility company or user, such as a system administrator. Such notification may indicate the expected time of primary power restoration, and the PBX 113 may then automatically update the priorities, as will be described in more detail below. In another embodiment, the PBX 113 may have a user interface (not shown) for receiving user inputs indicative of when restoration of primary power is expected.

Note that there are various techniques that may be used to assign priority levels based on the expected time remaining until restoration of the primary power. In one embodiment, the IP PBX 113 is configured to estimate the total amount of power that is expected to be consumed by each IP telephone 122 (and other powered devices that receive power from the backup power source 130) until the expected time of power restoration. Such determination is based on the telephone's priority level. As an example, an IP telephone 122 assigned a higher power level may be fully operational and, thus, expected to draw more power than a telephone that is transitioned to a low power mode due to being assigned a lower priority level. To facilitate such determination, the IP PBX 113 may be provisioned to store a table indicating an amount of power expected to be consumed by each powered device over time for each possible priority level. Other techniques for estimating that amount of power consumed by each powered device are possible in other embodiments.

The IP PBX 113 also estimates the total amount of power available in the backup power source 130. If the total power expected to be consumed by the powered devices until the expected time of primary power restoration is less than the estimated power remaining in the backup power source 130 within a desired margin of error, then the IP PBX 113 adjusts the priority levels so that more powered devices (e.g., IP telephones 122) are assigned higher priority levels.

Note that the types of powered devices other than telephones, such as cameras, may be tracked and controlled in the same manner as described herein for telephones. As an example, the amount of data transmitted by a security camera may be tracked in order to assign a priority to such security camera, and power may then be selectively provided to the security camera during a power outage based on its assigned priority.

Figure 3:
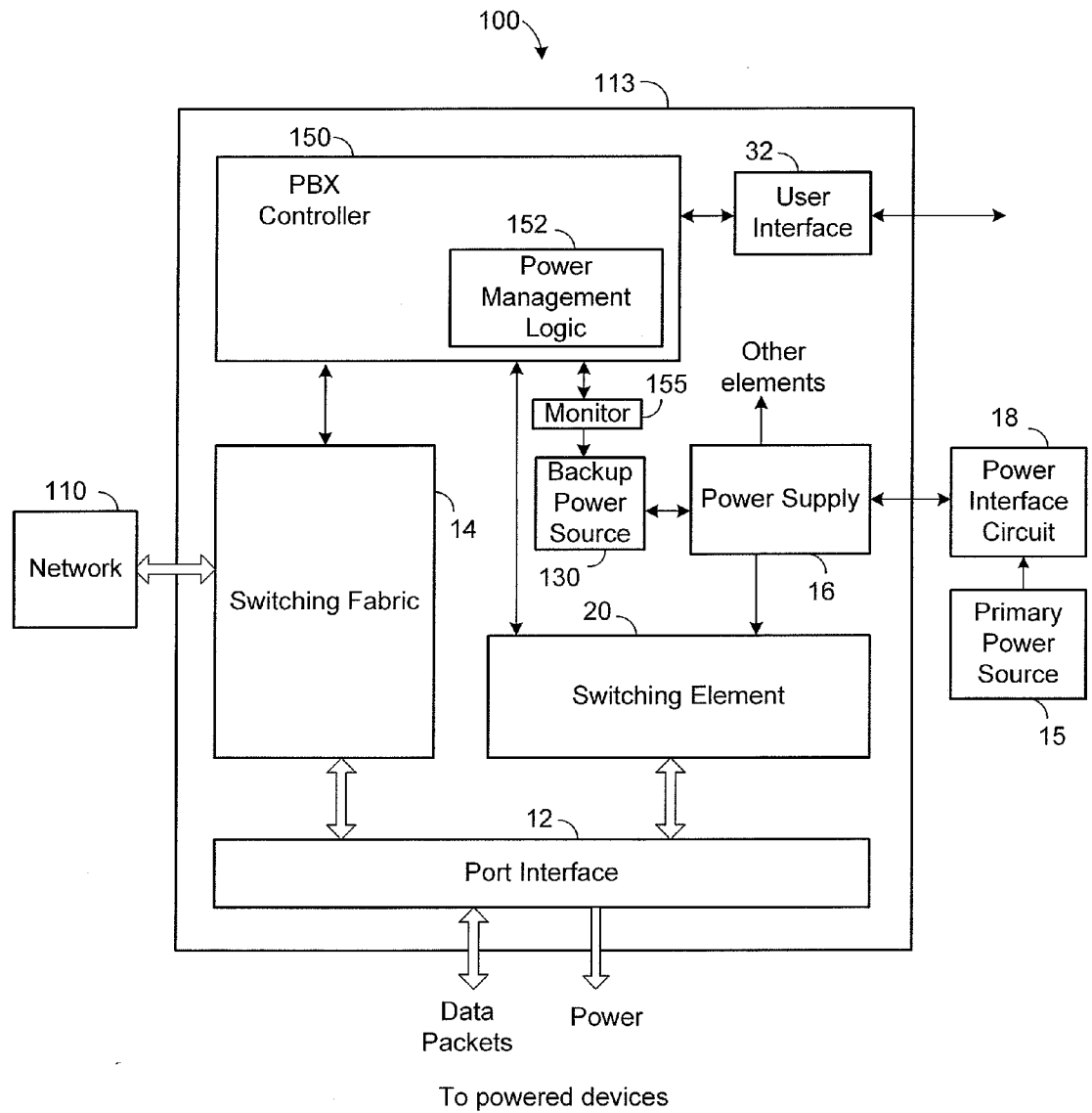
FIG. 3 is a block diagram illustrating another exemplary embodiment of a telecommunication system in accordance with the present disclosure.

An exemplary embodiment of a telecommunication system 100 of the present disclosure is depicted in FIG. 3. The telecommunication system 100 depicted by FIG. 3 comprises an IP PBX 113 that has various features, such as, for example, providing voicemail, extension groups, auto provisioning, etc., of a conventional PBX. The IP PBX 113 features are preferably selectable during installation and initialization. New features may be added to the IP PBX 113 when available and desired. IP PBX 113 has a controller 150 for controlling the general operation of the IP PBX. As shown in FIG. 3, the controller 150 comprises power management logic 152 for controlling power flow, as will be described in more detail below. The controller 150 may be implemented in hardware, software, firmware, or any combination thereof. A user interface 32 provides a connection to an input/output device, such as a computer, to allow a user to monitor, update, and configure the telecommunication system 100.

The telecommunication system 100 depicted by FIG. 3 receives power from a primary power source 15 coupled through power interface circuit 18 to a power supply 16. The power supply 16 converts an input voltage, such as a 120 VAC input, from the power interface circuit 18 to voltages compatible with components of the telecommunication system 100 and to powered devices (PDs) coupled to a port interface 12. The port interface 12 is configured to transport data packets between devices, such as PDs, and switching fabric 14. In addition, the port interface 12 is configured to provide a power path for coupling energy from the power supply 16 to each PD over one or more of the wires of respective cable, such as an Ethernet cable. Energy from the power supply 16 destined for a PD is preferably a DC voltage, such as 48 VDC, that is coupled to the port interface 12 through switching element 20. The switching element 20 comprises one or more switches, wherein each switch has a closed position and an open position. When a switch is in the closed position, a conductive path is established between the power supply 16 and a PD corresponding to that switch. At least one wire pair of a cable extending from the port interface 12 and assigned to the PD forms a portion of the conductive path. When a switch is in the open position, current flow is blocked and power from the power supply 16 cannot reach the PD assigned to that switch. The positions, i.e., opened or closed, of the switches are controlled by a control signal from power management logic 152. Although the components of IP PBX 113 are shown as one unit, in other embodiments other component arrangements are possible. For example, PBX functions may be in one unit, and a switching element and backup power may be in another unit.

When energy from the primary power source 15 is lost, due to a power system fault or other condition, then the backup power source 130 supplies energy to elements of the telecommunication system 100 and the PDs. In one embodiment, when primary power is lost, the power interface circuit 18 detects such event and sends a loss notification signal to the power supply 16, which responds by providing a conductive path between the power supply 16 and backup power source 130. A backup power monitor 155 of IP PBX 113 monitors the amount of energy remaining in the backup power source 130 and furnishes that information to the power management logic 152. Such information may be used by the power management logic 152 for making dynamic adjustments to energy flow as will be seen. The power management logic 152 is also notified that primary power is lost and, in response, takes actions to reduce power usage.

The power management logic 152 is configured to receive usage information of IP telephones or other devices of telecommunication system 100. For example, if IP PBX 113 provides telephone service, then data indicative of IP telephone usage is received and processed by power management logic 152. The power management logic 152 is configured to process telephone usage information in such a way as to assign priority levels to each IP telephone 122 (FIG. 2) or other powered device according to the exemplary techniques described above.

When the power management logic 152 is notified that primary power is lost, then the logic 152 sends a control signal to switching element 20, which selectively controls power delivery based on the assigned priorities. In one embodiment, the switching element 20 is responsive to the control signal for opening switches to PDs assigned the low priority and for ensuring that switches for PDs assigned the high priority are closed. In some embodiments, a second control signal from power management logic 152 may be sent through the switching fabric 14 to direct a PD assigned the low priority to transition to a low power mode. Upon receiving the second control signal, such PD responds by transitioning to a low power mode, if such a feature is available. As an example, the PD may turn off, go to sleep, or otherwise alter its operation (e.g., provide a reduced set of features) in order to consume less power.

Figure 4:
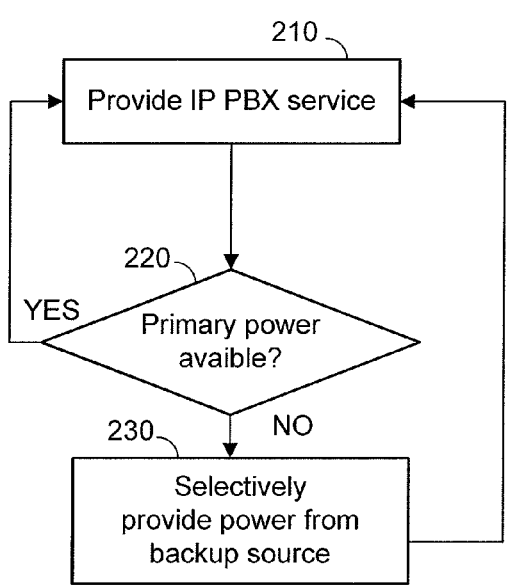
FIG. 4 is a flowchart illustrating an exemplary method for providing power to a telecommunication system, such as is depicted by FIG. 3.

An exemplary method for use in a telecommunication system 100 is depicted in FIG. 4. During normal operation, an IP PBX 113 provides telephone service, as shown by block 210 of FIG. 4. Power is supplied to the IP PBX 113 during normal operation by a primary power source 15. As long as power from the primary power source 15 is available, normal service is provided. However, when power from the primary power becomes unavailable, power is provided selectively from a backup power source 130, as shown by blocks 220 and 230, such as at least one battery. In this regard, power is selectively provided from the backup power source 130 via the power supply 16 to elements of the telecommunication system 100, such as IP telephones 122 (FIG. 2), as will be described in more detail below. When primary power later becomes available, the method automatically transitions back to block 210 such that the power supply 16 again begins to draw power from the primary power source 15 instead of the backup power source 16.

Figure 5:
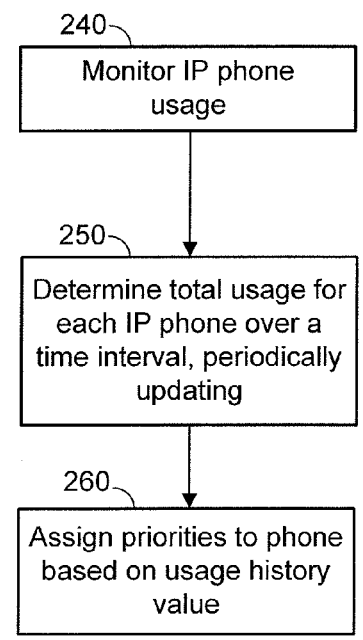
FIG. 5 is a flowchart illustrating an exemplary method for processing telephone usage history in a telecommunication system, such as is depicted by FIG. 3.

When the IP PBX 113 is providing telephone service during normal operation, IP telephone usage is monitored, as shown by block 240 of FIG. 5. The monitored telephone usage is processed and total usage for each IP telephone 122 is determined. The total usage for an IP telephone 122 may be found by summing the duration of each usage (e.g., call) of the IP telephone 122 over a windowed time interval, although other techniques may be used to determine total usage. Since usage patterns for telephones vary, the total usage is periodically updated over time. The total usage values for the IP telephones 122 are sequentially ordered from the highest usage to the lowest usage forming a usage sequence. Priorities are assigned to the IP telephones 122 based on such usage sequence, as shown by block 260, where telephones 122 with the most usage during the current window are assigned the highest priorities, as described above.

Note that over time, the usage sequence and, hence, assigned priority levels may change as usage changes. For example, if an IP telephone 122 assigned a relatively high priority is not used for an extended period of time, then the telephone's total usage value decreases over time such that it may be assigned a lower priority when the priority levels are updated. Conversely, if the usage increases for an IP telephone 122 that has been assigned a relatively low priority, then the telephone's total usage value increases over time such that it may be assigned a higher priority when the priority levels are updated.

Note that the tracked usage may include the time period of the power outage. For example, when a time-windowed usage technique is employed as described above, the usage of the power devices during a power outage has a more significant effect on the assigned priorities as the power outage progresses. In an alternative embodiment, the windowed time period may be limited to certain times. As an example, the priority decisions may be based on the last 10 days of usage prior to the outage. In another embodiment, after a certain amount of time has elapsed since the beginning of the power outage, only usage during the power outage is used to determine priorities. It is also possible for certain time periods to be weighted differently than others. For example, for a 10 day window, the last 2 days of usage may be given a higher weight than the previous 8 days such that the usage in the last 2 days has a more pronounced effect on how the priorities are assigned. In another example, the time during the power outage may be weighted more (or less) than the time prior to the outage.

Figure 6:
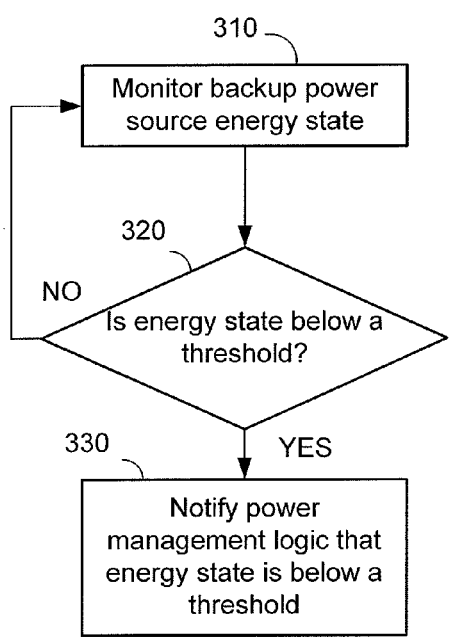
FIG. 6 is a flowchart illustrating an exemplary method for distributing power for a telecommunication system, such as is depicted by FIG. 3.

As shown by block 310 of FIG. 6, a backup power monitor 155 preferably monitors the amount of energy remaining in the backup power source 130 when power is not available from the primary power source 15. Techniques for monitoring backup power sources have often been used for portable communication devices, such as cellular telephone and laptop computers. As an example, the current and/or voltage of the power signal provided by the backup power source 130 may be measured and analyzed to determine a value indicative of an amount of energy remaining in the backup power source 130. In general, the more energy remaining, the longer the backup power source 130 can provide power for a given load condition.

The backup power monitor 155 is configured to compare the amount of energy remaining in the backup power source 130 to a predefined threshold. If the remaining energy is above a threshold, then the backup power monitor 155 does not provide any notification to the power management logic 152. However, if the energy remaining in the backup power source 155 falls below the threshold, then the backup power monitor 155 notifies the power management logic 152, as shown by blocks 320 and 330 of FIG. 6. When the power management logic 152 receives such a notification, the power management logic 152 readjusts the priorities assigned to the IP telephones 122 so that the energy drain on the backup power source 130 is reduced.

As an example, the power management logic 152 may assign at least some of the IP telephones 122 a lower priority so that they consume less power. In particular, if the assigned priorities are based on comparisons of the tracked usages to thresholds, as described above, then the thresholds may be increased so that fewer IP telephones 122 are assigned the higher priorities. In such case, more IP telephones 122 are transitioned to a low power mode so that the total power drawn from the backup power source 130 is decreased. In other embodiments, other techniques for adjusting the priority levels based on the amount of energy remaining in the backup power source 130 are possible.

Note that when power from the primary power source 15 is unavailable, there is often information available for indicating when power from the primary power source 15 will be restored in the future. For example, if a local circuit breaker is tripped because of a fault condition at a building in which the IP PBX 113 resides, it is often a relatively simple task to correct the fault and then reset the circuit breaker, thereby restoring power. In some cases, a power utility may publish or otherwise provide notice indicating when power through the primary power source 15 is likely to be restored. In one exemplary embodiment, a user provides an input via the user interface 32 indicating when power restoration is expected for the primary power source 15. The power management logic 152 is configured to assign priorities to the IP telephones 122 based on the amount of time remaining until expected power restoration. In this regard, the longer it is until the expected power restoration, more power will be required for operation of the high priority telephones 122. Thus, for long time periods until expected power restoration, the power management logic 152 may assign more IP telephone 122 lower priorities so that the life of the backup power source 130 is extended for powering the higher priority telephones 122.

As an example, if the expected time until power restoration is above a predefined threshold and if the assigned priorities are based on comparisons of the tracked usages to thresholds, as described above, then the thresholds may be increased so that fewer IP telephones 122 are assigned the higher priorities. In such case, more IP telephones 122 are transitioned to a low power mode so that the total power drawn from the backup power source 130 is decreased. In other embodiments, other techniques for adjusting the priority levels based on the amount of time remaining until expected power restoration are possible.

Figure 7:
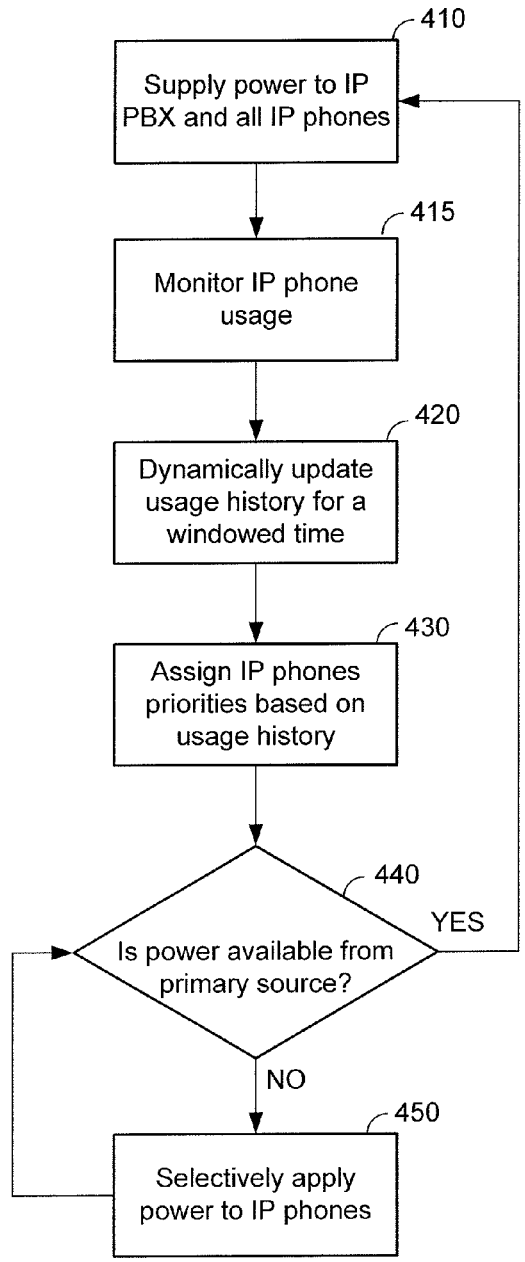
FIG. 7 is a flowchart illustrating an exemplary method for distributing power for a telecommunication system, such as is depicted by FIG. 3.

An exemplary method for extending the life of an IP PBX 113 during a fault associated with the primary power source 15 is depicted in FIG. 7. In normal operation, power is supplied from the primary power source 15 to the IP PBX 113 and all IP telephones, as shown by block 410. During such normal operation, as shown by block 415, the power management logic 152 monitors IP telephone usage in order to create usage information for assigning priorities to the IP telephones 122, as will be described in more detail below. As shown by block 420, the usage information is updated over time using a windowed-time interval giving a dynamically updated total usage of each telephone. The logic 152 also sequentially orders the total usage values from the highest value to the lowest value, and assigns priorities to the IP telephones 122 based on such sequentially-ordered usage histories, as shown by block 430. In this regard, IP telephones 122 with the highest usage values are assigned the highest priorities. As long as power is available from the primary power source 15, the IP PBX maintains normal operation. However, if primary power is lost then power is selectively applied to the IP telephones 122 from the backup power source 130 based on the assigned priorities, as shown by blocks 440 and block 450.

For example, power may be supplied from the backup power source 130 to the telephones 122 assigned a relatively high priority such that these telephones continue to operate in a normal mode of operation while operation of the telephones 122 assigned a lower priority are transitioned to a lower power mode in which they draw less power. In such case, the lower priority telephones 122 may be transitioned to an off or sleep state where they draw no power or very little power. Alternatively, the low priority telephones may be transitioned to a state for providing fewer features at a lower power. Other methods of assigning priorities and controlling the IP telephones 122 based on the assigned priorities are possible.

Figure 8:
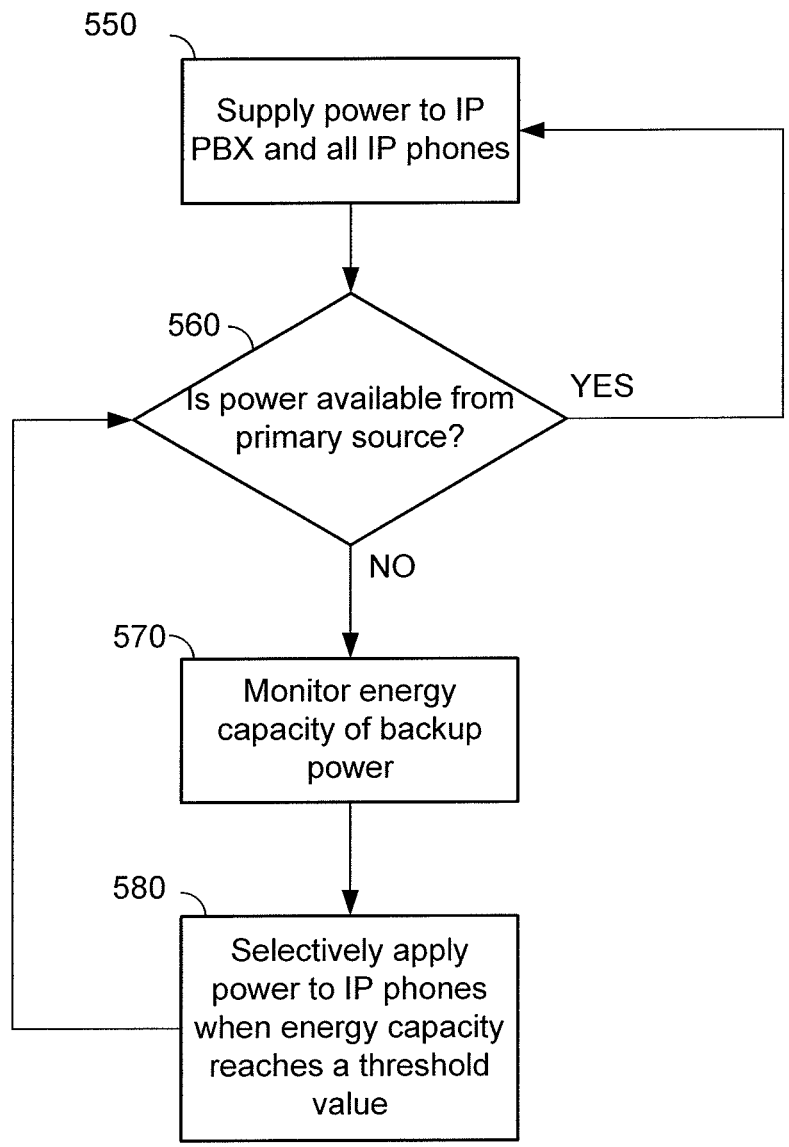
FIG. 8 is a flowchart illustrating an exemplary method for distributing power for a telecommunication system, such as is depicted by FIG. 3.

FIG. 8 depicts an exemplary method to reduce energy drain on an IP PBX 113. During normal operation, power is supplied to the IP PBX 113 by a primary power source 15, and all IP telephones 122 are powered, as shown by blocks 550 and 156. As long as power is available from the primary source 15, normal operation continues. However, if primary power is not available, power is furnished to the PBX 113 and IP telephones 122 by a backup power source 130. At such time the IP telephones 122 are powered the same as in normal operation prior to the power fault. However, the power management logic 152 monitors the energy capacity of the backup power source 130, as shown by block 570. Power is then selectively applied to IP telephones 122 when the energy capacity reaches a threshold value, as shown by block 580. As described above, the selectivity may be based on dynamic priority values that are determined based on a tracked usage history for the IP telephones 122 or the combination of dynamic priorities with other priority selection processes.

Now, therefore, the following is claimed:

1. A communication system, comprising:
   a plurality of telephones, including at least a first telephone and a second telephone;
   a controller configured to track usage histories of the telephones during a usage period and to assign priorities to the telephones based on the usage histories, wherein the controller is configured to assign, based on the usage histories, a first priority to at least the first telephone and a second priority to at least the second telephone; and
   a switching element coupled to and configured to provide power from a primary power source to each of the telephones, wherein the switching element, upon loss of power from the primary power source, is further configured to provide power from a backup power source to each of the telephones assigned a first priority and to reduce power to each of the telephones assigned a second priority.

2. The communication system of claim 1, wherein the usage period is prior to the loss of power from the primary power source.

3. The communication system of claim 1, wherein the usage histories are based on one or more device parameters.

4. The communication system of claim 1, wherein the controller is configured to sense a level of energy available from the backup power source during the loss of power from the primary power source and adjust the priorities during the loss of power from the primary power source based on the sensed level of energy available from the backup power source.

5. The communication system of claim 1, wherein the switching element is configured to prevent the telephones assigned the second priority from receiving power in response to the loss of power.

6. The communication system of claim 1, wherein the controller is configured to determine a value indicative of usage for the first telephone and compare the value to a threshold, the controller further configured to assign the first priority to the first telephone based on a comparison of the value to the threshold.

7. The communication system of claim 6, wherein the controller is configured to calculate a statistical parameter indicative of the usage histories, and wherein the threshold is based on the statistical parameter.

8. The communication system of claim 7, wherein the statistical parameter is a mean value.

9. The communication system of claim 1, wherein the controller is configured to sense a level of energy available from the backup power source during the loss of power from the primary power source and adjust the priorities during the loss of power from the primary power source based on the sensed level of energy such that the first telephone is assigned the second priority.

10. The communication system of claim 1, wherein the controller is configured to track usage histories of the telephones during the loss of power from the primary power source and adjust the priorities based on usage histories during the loss of power.

11. The communication system of claim 1, wherein the switching element is configured to provide the power from the primary power source based on the assigned priorities such that each of the telephones assigned the first priority is enabled for use in making telephone calls during the loss of power from the primary power source and such that each of the telephones assigned the second priority is disabled at least temporarily from making telephone calls during the loss of power from the primary power source.

12. A method for extending availability of service of a communication system, comprising:
    tracking usage of a plurality of telephones connected to the communication system with a controller, the plurality of telephones including at least a first telephone and a second telephone;
    automatically assigning, by the controller, a priority to each of the telephones based on its respective usage, wherein the assigning comprises assigning a first priority to at least the first telephone and assigning a second priority to at least the second telephone;
    monitoring a primary power source powering the communication system with the controller;
    switching to a backup power source with a switching element based on the monitoring when power from the primary power source is unavailable; and
    furnishing power to the telephones from the backup power source based on the assigned priorities when power from the primary power source is unavailable such that an amount of power furnished to at least the second telephone is reduced based on the second priority assigned to the second telephone.

13. The method of claim 12, further comprising:
    determining a value indicative of an amount of power available from the backup power source during the furnishing;
    comparing the value to a threshold; and
    updating the priorities based on the comparing such that an amount of power furnished to at least the first telephone is reduced.

14. The method claim 12, wherein the furnishing comprises furnishing power at a first level to each of the telephones assigned the first priority and furnishing power at a second level to each of the telephones assigned the second priority.

15. The method claim 12, wherein the assigning further comprises comparing a threshold to a value indicative of the usage of the first telephone, wherein the assigning the first priority is based on the comparing.

16. The method of claim 15, further comprising monitoring an amount of power available from the backup power source, wherein the threshold is based on the monitoring.

17. The method claim 12, wherein the communication system is an internet protocol private branch exchange.

18. The method of claim 12, further comprising adjusting the priorities of each of the telephones based on its respective usage during a period when power from the primary power source is unavailable.

19. The method of claim 12, wherein the furnishing is performed such that the first telephone is enabled, based on the first priority assigned to the first telephone, for use in making telephone calls during a time period when the primary power source is unavailable, and wherein the furnishing is performed such that the second telephone is disabled from making telephone calls during the time period based on the second priority assigned to the second telephone.

20. A method for distributing power to telephones, the method comprising:
    tracking usage histories of the telephones with a controller;
    automatically assigning, by the controller, priorities to the telephones based on the tracked usage histories;
    monitoring a primary power source with the controller to determine if power from the primary power source is available;
    furnishing power from a backup power source to each of the telephones assigned a first priority with a switching element in response to a determination that power from the primary power source is unavailable; and
    reducing an amount of power available from the backup power source to the telephones assigned a second priority in response to the determination.

21. The method claim 20, further comprising:
    determining a usage value for one of the telephones; and
    comparing the usage value to a threshold value, wherein the assigning is based on the comparing.

22. The method of claim 20, further comprising monitoring an amount of energy remaining in the backup power source, wherein the assigning is based on the amount of energy remaining in the backup power source.

23. The method of claim 20, further comprising reassigning priorities of the telephones based on a notification indicating an expected time of future restoration of the primary power source.

24. The method of claim 22, wherein the threshold is based on the monitoring the amount of energy remaining in the backup power source.

* * * * *